United States Patent
Ochiai et al.

[11] Patent Number: 5,962,137
[45] Date of Patent: Oct. 5, 1999

[54] ANTIBACTERIAL CARD

[75] Inventors: Tetsumi Ochiai; Sadanori Ito, both of Tokyo, Japan

[73] Assignee: Toppan Printing Company Limited, Tokyo, Japan

[21] Appl. No.: 08/936,776

[22] Filed: Sep. 24, 1997

Related U.S. Application Data

[63] Continuation of application No. 08/591,897, Jan. 25, 1996, abandoned.

[30] Foreign Application Priority Data

Jan. 27, 1995 [JP] Japan .................................... 7-031444

[51] Int. Cl.$^6$ ...................................................... B32B 9/04
[52] U.S. Cl. ...................... 428/411.1; 428/195; 428/204; 428/500; 428/501; 428/515; 428/688; 428/692
[58] Field of Search .................................... 428/141, 195, 428/204, 323, 411.1, 500, 501, 515, 688, 689, 692, 900, 913

[56] References Cited

U.S. PATENT DOCUMENTS

| | | | |
|---|---|---|---|
| 3,891,786 | 6/1975 | Conklin | 428/136 |
| 4,219,602 | 8/1980 | Conklin | 442/37 |
| 4,911,898 | 3/1990 | Hagiwara et al. | 423/700 |

FOREIGN PATENT DOCUMENTS

| | | |
|---|---|---|
| 63-54013 | 1/1983 | Japan . |
| 3-247674 | 11/1991 | Japan . |

OTHER PUBLICATIONS

Patent Abstract, Japan, vol. 15, No. 456, 03–195522 Inoue, Aug. 1991.
Patent Abstract, Japan, 07–126119 Sairenji et al., May 1995.
Patent Abstract, Japn, 07–16998 Suzuki et al., Jan. 1995.

*Primary Examiner*—William Krynski
*Assistant Examiner*—Chris Cronin
*Attorney, Agent, or Firm*—Graham & James LLP

[57] ABSTRACT

If at least the front surface layer and back surface layer of a plastic card formed from a plurality of layers are formed as antibacterial layers including (e. g.) coating layers, printed layers or sheets containing a powdered antibacterial agent, and this configuration is applied to hospital examination cards or various other types of cards that are handled by large numbers of persons, the spread of infections, etc., via said cards can be prevented even if said cards are not subjected to a disinfection treatment.

11 Claims, 2 Drawing Sheets

ANTIBACTERIAL CARD

This application is a continuation, of application Ser. No. 08/591,897 filed Jan. 25, 1996, now abandoned.

BACKGROUND OF THE INVENTION

The present invention concerns plastic cards which may be touched or held by large numbers of persons, such as cash cards, member cards, credit cards, prepaid cards and hospital examination cards, etc.

Cards of the above mentioned types include cards whose principal elements are a card base including a synthetic resin such as polyvinyl chloride, etc., a coating layer or film-form sheet, etc., which is formed on the front and back surfaces of said card base, and a magnetic stripe which is formed at a specified location on the aforementioned coating layer or film-form sheet. These cards are called by the respective names mentioned above in accordance with the use of said cards.

However, in the case of conventional cards of the above mentioned types, the cards may be touched by the hands of large numbers of persons. Accordingly, in the case of (for example) hospital examination cards, which have shown an abrupt increase in use in recent years, there is a danger that infections may be spread through the medium of pathogenic organisms, etc., adhering to the cards. Furthermore, although it would be possible to avoid the spread of infection by subjecting the above mentioned hospital examination cards to periodic disinfection, etc., at hospitals or the like, a special treatment would be required for this purpose, thus complicating the handling of the cards. Moreover, since various pathogenic organisms are present not only in hospitals, but also in general outdoor and indoor locations, the above mentioned problems are also encountered in cards other than hospital examination cards.

Accordingly, the principal object of the present invention is to provide a card endowed with an antibacterial function which can prevent pathogenic organisms from spreading infections even if such pathogenic organisms should adhere to the card, and which can accomplish this goal without complicating the structure of the card itself.

SUMMARY OF THE INVENTION

The present invention provides a card in which at least the front surface layer and back surface layer of a plastic card comprising of a plurality of layers are antibacterial layers which contain a powdered antibacterial agent. As a result, when the present invention is applied to hospital examination cards or other cards which might be handled by large numbers of persons, the spread of infections, etc., via these cards can be prevented. Furthermore, even in cases where the present invention is utilized in other cards, said cards are extremely clean due to the presence of the aforementioned antibacterial function, and can therefore be used with confidence.

BRIEF DESCRIPTION OF THE DRAWINGS

Objects and advantages of the present invention other than those described above will be thoroughly understood from the following description with reference to the attached drawings.

DETAILED DESCRIPTION OF PREFERRED EMBODIMENTS

The antibacterial card of the present invention is characterized by the fact that at least the front surface layer and back surface layer of a card including a plurality of layers are formed as antibacterial layers.

Furthermore, the above mentioned antibacterial layers which have an antibacterial function may be formed by coating layers containing a powdered antibacterial agent or printed layers including an ink containing a powdered antibacterial agent, or may be formed by bonding film-form sheets containing a powdered antibacterial agent to the card. Moreover, in cases where the antibacterial layers are formed by film-form sheets containing a powdered antibacterial agent, magnetic stripes used to hold data may be embedded in portions of said film-form sheets.

Figure 1A:
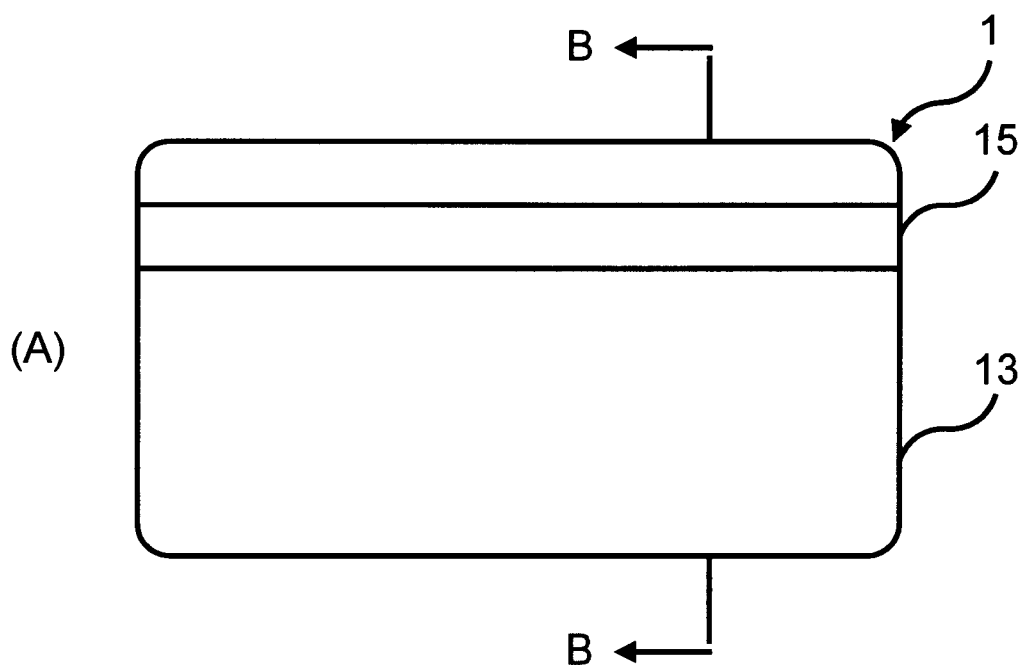
FIG. 1(A) is a plan view which illustrates one example of the antibacterial card of the present invention.
Figure 1B:
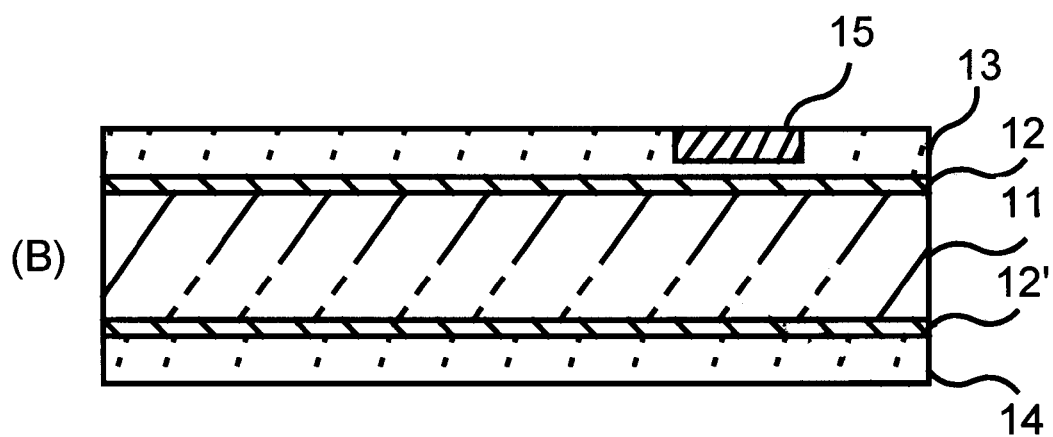
FIG. 1(B) is a sectional view along line B—B in FIG. 1(A).

FIGS. 1(A) and 1(B) show a plan view of the antibacterial card of the present invention, and a sectional view along line B—B in said plan view. Specifically, this antibacterial card 1 consists of a card base 11 made of a white polyvinyl chloride resin, etc., and printed layers 12 which are formed on the front surface and back surface of said card base 11. Plastic film-form sheets 13 and 14 (e. g., films including a polyvinyl chloride resin) containing a powdered antibacterial agent are laminated on the surfaces of the aforementioned printed layers 12; furthermore, a magnetic stripe 15 is embedded in the plastic film-form sheet 13.

In this case, the above mentioned magnetic stripe 15 does not have an antibacterial function (unlike the film-form sheet 13 containing a powdered antibacterial agent). Accordingly, in a desirable configuration of the present invention, a powdered antibacterial agent is mixed with the magnetic layer forming the aforementioned magnetic stripe 15. Furthermore, the magnetic stripe is ordinarily formed from a magnetic layer including a magnetic powder and a binder, and a band-form film which supports this magnetic layer. In this case, a powdered antibacterial agent may be dispersed along with the magnetic powder in the above mentioned magnetic layer. Moreover, a magnetic stripe which does not have the above mentioned band-form film may also be used; in this case as well, a powdered antibacterial agent may be dispersed in the above mentioned magnetic layer along with the magnetic powder.

Figure 2:
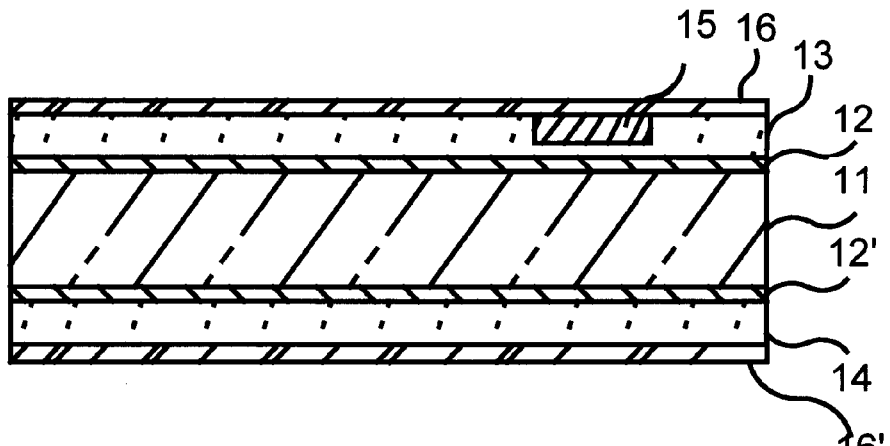
FIG. 2 is a sectional view which illustrates another example of the antibacterial card of the present invention.

Furthermore, in other configurations of the present invention, coating layers which contain a powdered antibacterial agent may be applied to the surfaces of film-form sheets which do not contain a powdered antibacterial agent, or (as is shown in FIG. 2) coating layers 16, 16' which contain a powdered antibacterial agent may be further applied to the surfaces of film-form sheets 13, 14 which also contain a powdered antibacterial agent. The configuration shown in FIG. 2 is especially effective, since the antibacterial function of the card can be maintained even in cases where the thin coating layers 16, 16' containing a powdered antibacterial agent are stripped away. Moreover, depending on the use of the card, one of the plastic film-form sheets 13 or 14 shown in FIG. 2 may consist of a conventional plastic film-form sheet which does not contain a powdered antibacterial agent.

Furthermore, in the antibacterial cards illustrated in FIGS. 1(A) and 1(B) and in FIG. 2, printed layers 12, 12' are formed on the front and back surfaces of the card base 11; accordingly, it is necessary that the plastic film-form sheets 13, 14 and coating layers 16, 16' be formed from a transparent material.

Figure 3:
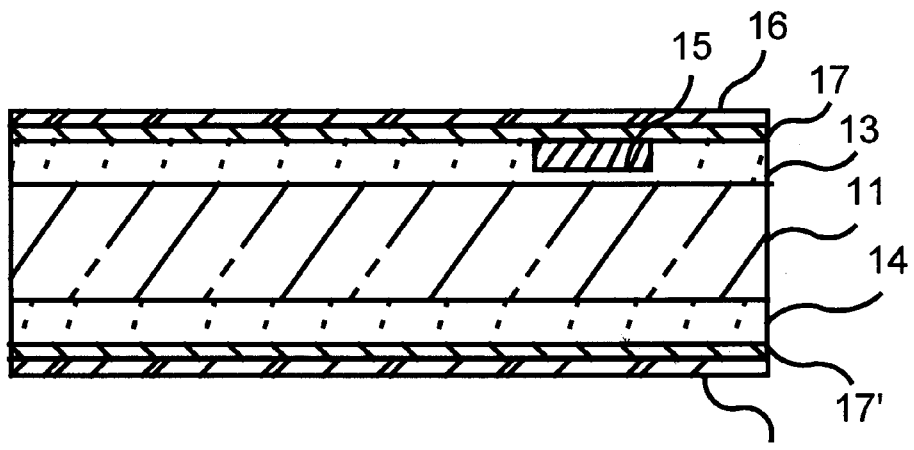
FIG. 3 is a sectional view which illustrates another example of the antibacterial card of the present invention.
Figure 4:
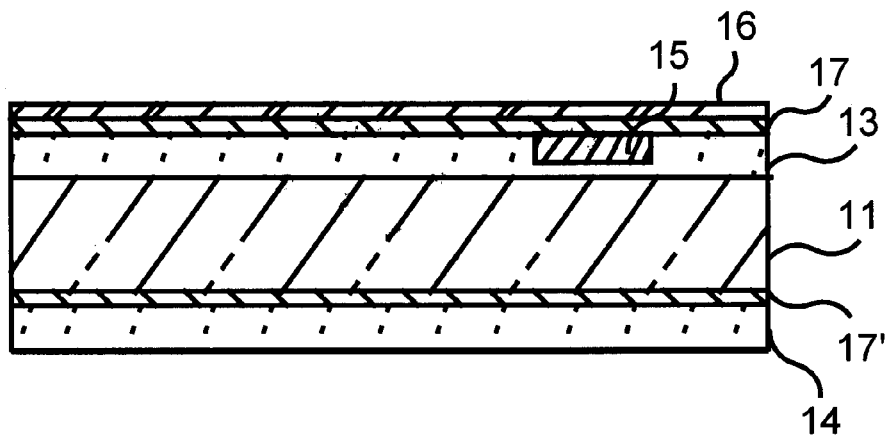
FIG. 4 is a sectional view which illustrates another example of the antibacterial card of the present invention.

In addition, FIGS. 3 and 4 illustrate other configurations of the antibacterial card of the present invention. Specifically, the main parts of the antibacterial card illustrated in FIG. 3 are a card base 11 which is made of a white polyvinyl chloride resin, etc., plastic film-form sheets (polyvinyl chloride resin films, etc.) 13, 14 containing a powdered antibacterial agent which are laminated on the front and back surfaces of said card base 11, a magnetic stripe 15 which is embedded in the above mentioned film-form sheet 13, printed layers 17, 17' (including an ink containing a powdered antibacterial agent) which are formed on the surfaces of the aforementioned plastic film-form sheets 13, 14, and coating layers 16, 16' (also containing a powdered antibacterial agent) which are formed on the surfaces of the aforementioned printed layers 17, 17'. In this configuration, the black or brown magnetic stripe 15 can be hidden by the aforementioned printed layer 17, so that the appearance of the card is improved.

Furthermore, depending on the intended use of the antibacterial card, it would also be possible to use a configuration in which the above mentioned coating layers 16, 16' containing a powdered antibacterial agent are omitted (as a modification of the above mentioned configuration). Similarly, it would also be possible to form the above mentioned plastic film-form sheets 13, 14 from conventional plastic film-form sheets which do not contain a powdered antibacterial agent.

Moreover, the antibacterial card illustrated in FIG. 4 is a card formed by altering the make-up of the back surface of the antibacterial card illustrated in FIG. 3. Specifically, a printed layer 17' including an ordinary printing ink is formed on the back surface of the card base 11, and a plastic film-form sheet 14 (polyvinyl chloride resin film etc.) containing a powdered antibacterial agent is laminated on the surface of this printed layer 17'.

Furthermore, as modifications of the above configuration, it would also be possible (depending on the intended use of the antibacterial card) to use a configuration in which the coating layer 16 containing a powdered antibacterial agent is omitted, or to form the above mentioned plastic film-form sheet 13 from a conventional plastic film-form sheet which does not contain a powdered antibacterial agent.

Here, antibacterial zeolite may be cited as an example of a powdered antibacterial agent which can be used in the present invention.

The term "antibacterial zeolite" refers to a compound which has a structure in which some or all of the ion-exchangeable metal atoms (M) in a synthetic zeolite expressed by the general formula $xMO \cdot Al_2O_3 \cdot ySiO_2 \cdot z$ (here, x and y are the respective coefficients of the metal oxide and silica with $Al_2O_3$ taken as 1, and z is the coefficient of the water of crystallization) are replaced by at least one metal ion species with antibacterial properties selected from a set including silver, copper, zinc, mercury, tin, lead, bismuth, cadmium and chromium. An example of such a compound is "Bactekiller" (registered trademark), which is marketed by Kanebo Co., Ltd. Furthermore, such antibacterial zeolites are ordinarily provided in the form of a master batch (that is, in the form of pellets). Accordingly, in order to mix the aforementioned powdered antibacterial agent with the aforementioned plastic film-form sheets, it is necessary merely to mix and melt the resin pellets which form the sheets and the master batch containing the powdered antibacterial agent.

Furthermore, in order to obtain an antibacterial function, it is necessary to mix or knead a powdered antibacterial agent into the aforementioned antibacterial layers at the rate of 0.2 wt % or greater. However, if large amounts of a powdered antibacterial agent are mixed or kneaded into the antibacterial layers, said antibacterial layers may turn a yellowish color; accordingly, it is desirable that the amount of powdered antibacterial agent that is mixed or kneaded into the antibacterial layers be 5.0 wt % or less.

Furthermore, examples of other powdered antibacterial agents which can be used in the present invention include compounds in which organic antibacterial agents are held in phosphates that have a layer-form structure.

Quaternary ammonium ions formed by ionizing quaternary ammonium salts that have an antibacterial effect may be cited as one example of organic antibacterial agents. Such quaternary ammonium ions are monovalent cations in which four carbon bonds are directly lined to a nitrogen atom; examples include alkyltrimethylammonium ions and dialkyldimethylammonium ions, etc. Furthermore, thiazole compounds may be cited as another example of organic antibacterial agents.

Phosphates which have a layer-form structure can be expressed by the general formula $M(HPO_4)_2 \cdot nH_2O$ (here, M indicates a tetravalent metal, or a trivalent metal and n=0 to 2). In concrete terms, zirconium phosphate and titanium phosphate may be cited as examples. Furthermore, mixtures including two or more different types of phosphates may also be used.

When phosphates which have such a layer-form structure are agitated in a solution together with organic antibacterial agents, ion exchange occurs between the protons of the hydrogen phosphate groups ($HPO_2^{2-}$) and the quaternary ammonium ions, etc., so that the phosphates with a layer-form structure retain the organic antibacterial agents. Since such phosphates firmly hold said organic antibacterial agents, the antibacterial function has a longer duration than it does in cases where organic antibacterial agents are used alone.

Furthermore, in regard to the above mentioned powdered antibacterial agents, it is desirable to use a plurality of powdered antibacterial agents with different mean particle sizes. Specifically, if powdered antibacterial agents with a large particle size and powdered antibacterial agents with a small particle size are mixed, and this mixture is mixed with the aforementioned coating layers or printed layers (including an ink), or is kneaded into the aforementioned plastic film-form sheets, [the small antibacterial agent particles] will fill the spaces between [the large] antibacterial agent particles, so that the antibacterial layers tend to have a greater apparent uniformity.

Furthermore, in regard to the constituent materials other than the above mentioned powdered antibacterial agents (e. g., the card base which forms the main part of the card, as well as the coating layers, inks, plastic film-form sheets and magnetic stripe, etc., that are used), conventionally known materials may be used "as is" in the present invention.

Below, embodiments of the present invention will be described in detail with reference to the attached figures:

[Embodiment 1]

The antibacterial card 1 of this embodiment was formed from a card base 11 made of a white polyvinyl chloride resin, and printed layers 12 (including an ordinary printing ink) which were formed on the front and back surfaces of said card base 11, as shown in FIGS. 1(A) and 1(B). Furthermore, plastic film-form sheets 13, 14 (made of a polyvinyl chloride resin) into which a powdered inorganic antibacterial agent (i. e., Bactekiller BM-102DC, commercial name of an antibacterial zeolite marketed by Kanebo Co., Ltd.) had been kneaded were laminated as the front and back surface layers of this card, and a magnetic stripe 15 was embedded in the plastic film-form sheet 13.

Furthermore, the mixture ratio of the above mentioned powdered inorganic antibacterial agent in the plastic film-form sheets 13, 14 was 0.2 wt %

Method Used to Test Antibacterial Properties

Next, the antibacterial properties of the antibacterial card of this embodiment were evaluated by the method described below:

First, the antibacterial card was inoculated with 0.2 ml of a suspension of coliform bacteria (*Escherichia coli* IFO 3301), and was tightly covered with a polyethylene film. The card was then stored at 35° C., and the live organisms were washed out after 24 hours of storage. The number of live organisms thus washed out was measured using an agar plate culturing method (2 days at 35° C.) employing a culture medium used for the measurement of numbers of organisms, and the number of live organisms per card was calculated.

Furthermore, for purposes of comparison, a card with the same structure as that in Embodiment 1 (except that no powdered inorganic antibacterial agent was added) was prepared (Comparative Example 1). This card was inoculated with the same bacterial suspension, and was subjected to the same test. The results obtained are shown in Table 1.

[Embodiment 2]

The antibacterial card of this embodiment was identical to the antibacterial card of Embodiment 1, except that the mixture ratio of the powdered inorganic antibacterial agent in the plastic film-form sheets 13, 14 was 0.3 wt %.

The antibacterial card of this embodiment was inoculated with the same bacterial suspension and subjected to the same test as in Embodiment 1. The results obtained are shown in Table 1.

[Embodiment 3]

The antibacterial card of this embodiment was identical to the antibacterial card of Embodiment 1, except that the mixture ratio of the powdered inorganic antibacterial agent in the plastic film-form sheets 13, 14 was 0.5 wt %.

The antibacterial card of this embodiment was inoculated with the same bacterial suspension and subjected to the same test as in Embodiment 1. The results obtained are shown in Table 1.

[Embodiment 4]

The antibacterial card of this embodiment was identical to the antibacterial card of Embodiment 1, except that the mixture ratio of the powdered inorganic antibacterial agent in the plastic film-form sheets 13, 14 was 1.0 wt %.

The antibacterial card of this embodiment was inoculated with the same bacterial suspension and subjected to the same test as in Embodiment 1. The results obtained are shown in Table 1.

TABLE 1

| | Number of Live Organisms | |
|---|---|---|
| | Initial | After 24 hours at 35° C. |
| Embodiment 1 | $6.3 \times 10^5$ | $1.2 \times 10^3$ |
| Embodiment 2 | $6.3 \times 10^5$ | less than 10 |
| Embodiment 3 | $6.3 \times 10^5$ | less than 10 |
| Embodiment 4 | $6.3 \times 10^5$ | less than 10 |
| Comparative Example 1 | $6.3 \times 10^5$ | $8.2 \times 10^6$ |

Evaluation of Antibacterial Properties

Ordinarily, an antibacterial function was judged to be present if the number of live organisms inoculated showed a second-order decrease after 24 hours. Accordingly, it was confirmed that the antibacterial cards of all of the above mentioned embodiments showed a sufficient antibacterial function.

Furthermore, the antibacterial zeolite (commercial name: Bactekiller BM-102DC) used in the above embodiments has been confirmed by various tests to be safe and non-toxic; moreover, this antibacterial zeolite is superior in terms of stability, and shows almost no change over time. Accordingly, an enduring antibacterial function is obtained. Furthermore, this zeolite is also superior in terms of heat resistance and resistance to acids and alkalies, and is therefore suitable for use as a powdered antibacterial agent in the present invention.

[Embodiment 5]

The antibacterial card of this embodiment was formed from the following main parts (as shown in FIG. 4): i. e., a card base 11 which was made of a white polyvinyl chloride resin and which had a printed layer 17' including an ordinary printing ink formed on its back surface, a plastic film-form sheet 14 (made of a polyvinyl chloride resin) containing a powdered inorganic antibacterial agent (Bactekiller BM-102DC (commercial name), an antibacterial zeolite) at the rate of 0.5 wt %, which was formed on the surface of the aforementioned printed layer 17', a plastic film-form sheet 13 (made of a polyvinyl chloride resin) not containing the above mentioned powdered inorganic antibacterial agent, which was formed on the front surface of the above mentioned card base 11, and which had a magnetic stripe 15 embedded in a portion of said plastic film-form sheet, a printed layer 17 including an ordinary printing ink which was formed on the surface of the above mentioned plastic film-form sheet 13, and an acrylic resin coating layer 16 containing the above mentioned powdered inorganic antibacterial agent at the rate of 0.5 wt %, which was formed on the surface of the above mentioned printed layer 17.

Furthermore, the antibacterial card of this embodiment was inoculated with the same bacterial suspension and subjected to the same test as in Embodiment 1. The results obtained are shown in Table 2. In addition, for purposes of comparison, a card which had the same structure as that in Embodiment 4 (except that no powdered inorganic antibacterial agent was added) was prepared (Comparative Example 2). This card was inoculated with the same bacterial suspension, and was subjected to the same test as in Embodiment 1. The results obtained are also shown in Table 2.

Furthermore, this configuration is advantageous from the standpoint of cost, since there is no need to form a coating layer on the back surface.

[Embodiment 6]

The antibacterial card of this embodiment was identical to the antibacterial card of Embodiment 4, except that the mixture ratio of the powdered inorganic antibacterial agent in the acrylic resin coating layer 16 was 1.0 wt %.

The antibacterial card of this embodiment was inoculated with the same bacterial suspension and subjected to the same test as in Embodiment 1. The results obtained are shown in Table 2.

[Embodiment 7]

The antibacterial card of this embodiment was identical to the antibacterial card of Embodiment 4, except that the acrylic resin coating layer 16 contained a powdered inorganic antibacterial agent (at the rate of 0.25 wt %) formed by uniformly mixing powdered inorganic antibacterial agents with respective mean particle sizes of 1 micron, 3 microns and 5 microns.

The antibacterial card of this embodiment was inoculated with the same bacterial suspension and subjected to the same test as in Embodiment 1. The results obtained are shown in Table 2.

TABLE 2

|  | Number of Live Organisms | |
| --- | --- | --- |
|  | Initial | After 24 hours at 35° C. |
| Embodiment 5 | $6.3 \times 10^5$ | less than 10 |
| Embodiment 6 | $6.3 \times 10^5$ | less than 10 |
| Embodiment 7 | $6.3 \times 10^5$ | less than 10 |
| Comparative Example 2 | $6.3 \times 10^5$ | $8.2 \times 10^6$ |

Furthermore, a test evaluating antibacterial properties was performed in the sample manner as in the above mentioned Embodiments 1 through 4.

[Embodiment 8]

The antibacterial card of this embodiment was formed from the following main parts (as shown in FIG. 4): i. e., a card base 11 which was made of a white polyvinyl chloride resin and which had a printed layer 17' including an ordinary printing ink formed on its back surface, a plastic film-form sheet 14 (made of a polyvinyl chloride resin) containing a powdered antibacterial agent (including an organic antibacterial agent (benzalkonium ion agent) held in a phosphate having a layer-form structure (i. e., a phosphate of a tetravalent metal)) at the rate of 0.2 wt %, which was formed on the surface of the aforementioned printed layer 17', a plastic film-form sheet 13 (made of a polyvinyl chloride resin) not containing the above mentioned powdered antibacterial agent which was formed on the front surface of the above mentioned card base 11, and which had a magnetic stripe 15 embedded in a portion of said plastic film-form sheet, a printed layer 17 including an ordinary printing ink which was formed on the surface of the above mentioned plastic film-form sheet 13, and an acrylic resin coating layer 16 containing the above mentioned powdered antibacterial agent (including an organic antibacterial agent held in a phosphate having a layer-form structure) at the rate of 0.2 wt %, which was formed on the surface of the above mentioned printed layer 17.

Furthermore, the antibacterial card of this embodiment was inoculated with the same bacterial suspension and subjected to the same test as in Embodiment 1. The results obtained are shown in Table 3.

TABLE 3

|  | Number of Live Organisms | |
| --- | --- | --- |
|  | Initial | After 24 hours at 35° C. |
| Embodiment 8 | $6.3 \times 10^5$ | less than 10 |

Furthermore, a test evaluating antibacterial properties was performed in the same manner as in the above mentioned Embodiments 1 through 4.

Several working configurations of the present invention were described in detail above. However, in regard to the selection of materials for desirable working configurations of the present invention, various changes may be made without departing from the spirit or scope of the present invention as claimed below.

What is claimed is:

1. An antibacterial card comprising a plurality of layers including at least a front surface layer and a back surface layer of said card, said front and back surface layers are formed of transparent antibacterial layers each containing an antibacterial agent of 0.2 wt % to 5 wt %, the plurality of layers further including a printed layer comprising an ink and being disposed between the front and back surface layers.

2. An antibacterial card, as defined in claim 1, wherein at least one of the antibacterial layers includes a transparent coating layer with which the antibacterial agent has been mixed.

3. An antibacterial card, as defined in claim 2, wherein the transparent coating layer is an acrylic resin coating layer.

4. An antibacterial card, as defined in claim 1, wherein at least one of the antibacterial layers includes a transparent plastic film-form sheet into which the antibacterial agent has been kneaded.

5. An antibacterial card, as defined in claim 3, further comprising a magnetic stripe embedded in a portion of the plastic film-form sheet.

6. An antibacterial card, as defined in claim 4, wherein the magnetic stripe includes a magnetic layer into which a powdered antibacterial agent has been mixed.

7. An antibacterial card, as defined in claim 4, further comprising a coating layer with which a powdered antibacterial agent has been mixed, the coating layer being formed on the surface of the plastic film-form sheet.

8. An antibacterial card, as defined in claim 3, wherein the transparent plastic film-form sheet is a polyvinyl chloride resin sheet.

9. An antibacterial card, as defined in claim 1, wherein the antibacterial agent comprises an antibacterial zeolite.

10. An antibacterial card, as defined in claim 1, wherein the antibacterial agent is a powered antibacterial agent in which an organic antibacterial agent is held in a phosphate having a layer-form structure.

11. An antibacterial card, as defined in claim 1, wherein the powdered antibacterial agent is a mixture of a plurality of powdered antibacterial agents with different mean particle sizes.

* * * * *

UNITED STATES PATENT AND TRADEMARK OFFICE
CERTIFICATE OF CORRECTION

PATENT NO. : 5,962,137

DATED : October 5, 1999

INVENTOR(S) : Tetsumi Ochiai and Sadanori Ito

It is certified that error appears in the above-identified patent and that said Letters Patent is hereby corrected as shown below:

Column 8, line 53, "powered" should read --powdered--

Signed and Sealed this

Ninth Day of May, 2000

Attest:

Attesting Officer

Q. TODD DICKINSON

Director of Patents and Trademarks